June 2, 1931.  A. R. SIMON  1,807,879
ADJUSTABLE VISOR
Filed May 19, 1926  3 Sheets-Sheet 3
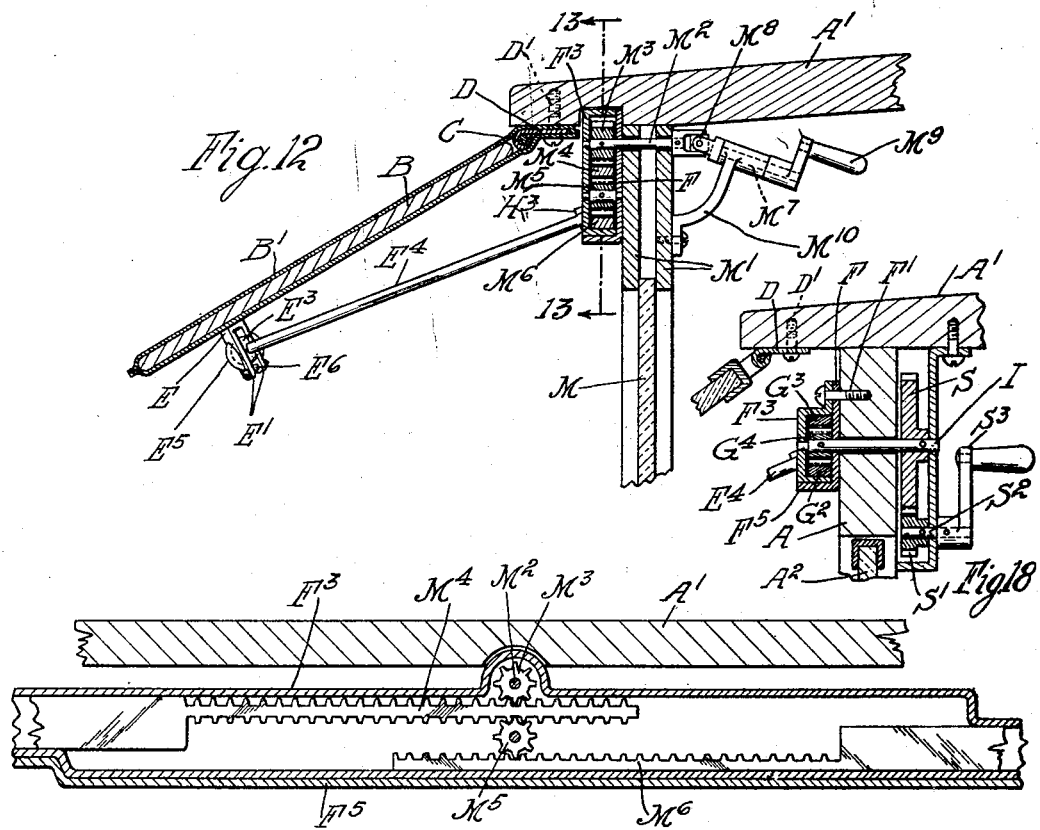
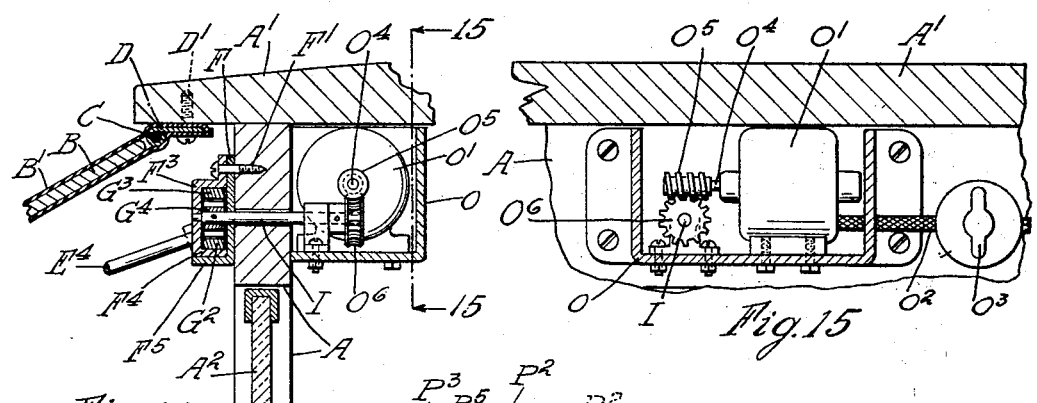
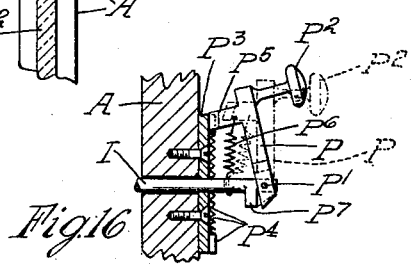
Inventor
Arthur R. Simon
by Parker + Carter
Attorneys Patented June 2, 1931

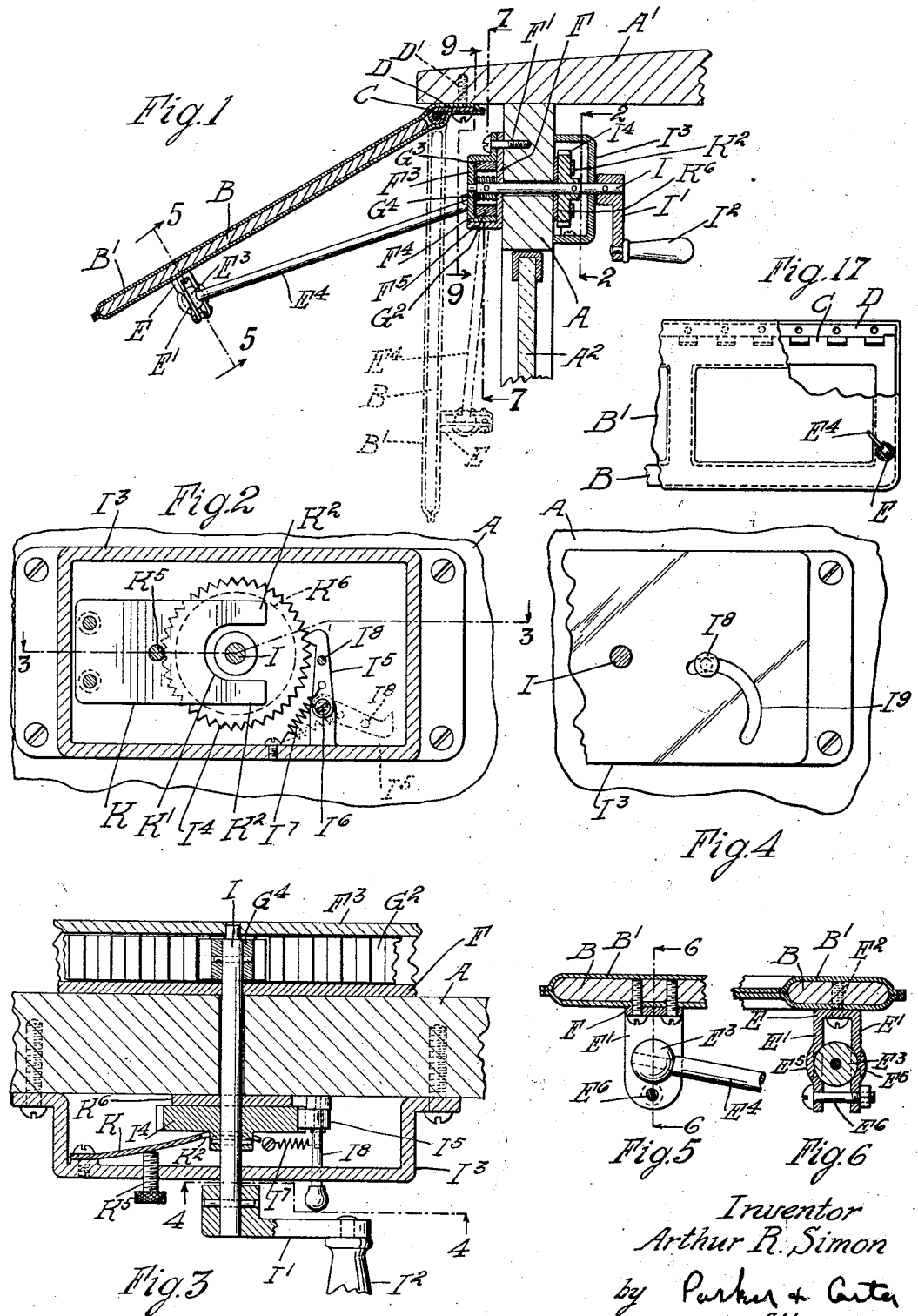

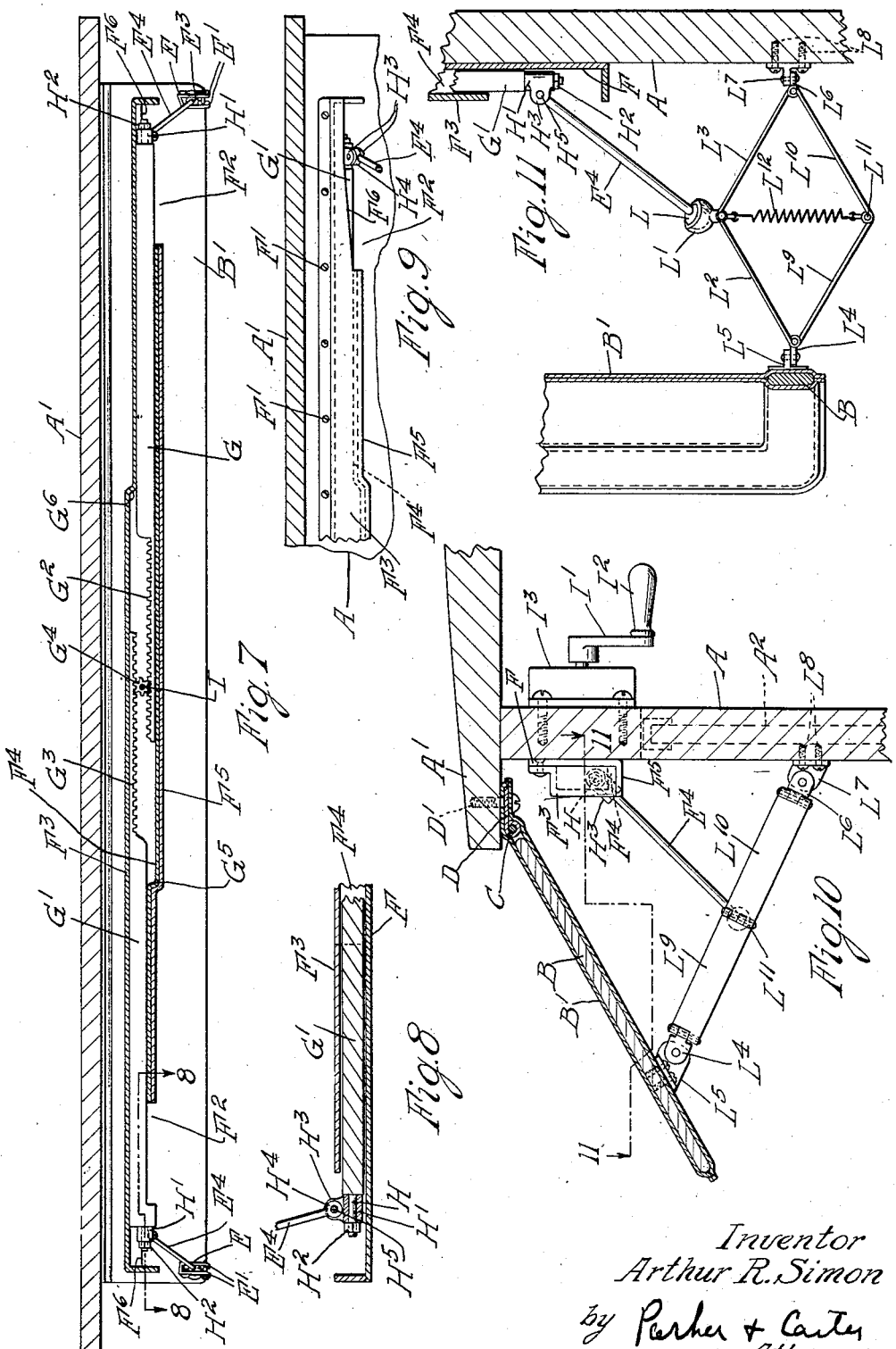

1,807,879

UNITED STATES PATENT OFFICE

ARTHUR R. SIMON, OF LA PORTE, INDIANA

ADJUSTABLE VISOR

Application filed May 19, 1926. Serial No. 110,058.

This invention relates to an automobile visor, that is to say to a visor or projecting shield adapted preferably to be mounted on an automotive vehicle and in operative relation to its windshield. It may be applied to a vehicle having a normally closed body in which case it will usually be mounted on the body frame or it may be applied to a vehicle having a folded or demountable body in which case it will usually be mounted on the wind shield or wind shield support.

One object of my invention is to provide an adjustable visor which may be mounted on the vehicle and which may readily be raised and lowered. Another object is to provide in connection with such a visor means for supporting it and adjusting it without the necessity of stopping the vehicle or reaching outside the vehicle body to make the adjustment. Another object is the provision of an adjustable visor which is so secured and pivoted to the vehicle as to provide maximum strength and stability. Another object is to provide improved means for raising, lowering and supporting the adjustable visor. Other objects will appear from time to time throughout the specification and claims.

I illustrate my invention more or less diagrammatically in the accompanying drawings, wherein—

Figure 1 is a vertical transverse section through one form of my device;

Figure 2 is a section on the line 2—2 of Figure 1;

Figure 3 is a section on the line 3—3 of Figure 2;

Figure 4 is a section on the line 4—4 of Figure 3;

Figure 5 is a section on the line 5—5 of Figure 1;

Figure 6 is a section on the line 6—6 of Figure 5;

Figure 7 is a section on the line 7—7 of Figure 1;

Figure 8 is a section on the line 8—8 of Figure 7;

Figure 9 is a section on the line 9—9 of Figure 1;

Figure 10 is a section similar to Figure 1 illustrating a variant form;

Figure 11 is a section on the line 11—11 of Figure 10;

Figure 12 is a section similar to Figures 1 and 10 through a third form;

Figure 13 is a section on the line 13—13 of Figure 12;

Figure 14 is a section similar to Figures 1, 10 and 12 illustrating a variant form;

Figure 15 is a section on the line 15—15 of Figure 14;

Figure 16 is a detail of a variant form of actuating means;

Figure 17 is a detail of the visor hinge; and

Figure 18 is a vertical section through a variant form.

Like parts are indicated by like symbols throughout the specification and drawings.

A illustrates a portion of the body frame and $A^1$ the roof of the body. $A^2$ indicates the glass or wind shield in the front of the body.

B indicates the visor frame. The visor frame is provided with a covering $B^1$ of any suitable material. It is provided along its rear edge with a multiple hinge C, the hinge preferably extending from end to end of the visor. By means of the hinge the visor is adjustably joined to an attaching strip D which is fastened to the roof $A^1$ of the vehicle body by means of screws, rivets or any other suitable attaching means $D^1$.

As shown for example in Figures 1, 5 and 6, the frame member has fastened to it holding brackets or abutments E each consisting of a pair of ears $E^1$ which may be integral with each other or may be separately made. The members E are preferably removably fastened to the frame B for example by screws $E^2$. Secured between the ears $E^1$ is a rotary member $E^3$, herein shown as a ball, which is secured to the end of any suitable link member $E^4$. The ears $E^1$ are provided with inward impressions $E^5$ which serve as a socket for the ball $E^3$. A bolt $E^6$ is provided so that the ears may be drawn together to adjust the tension on the ball.

F is a rear and bottom casing member extending substantially from end to end of the forward frame member A, to which it is secured for example by screws $F^1$. It is cut away at the ends as at $F^2$. $F^3$ is the top and front member of the same casing similarly secured by the screws $F^1$, its forward face being inturned as at $F^4$ to overlie the lower flange $F^5$ of the member F. It is also cut away at the end as at $F^6$.

Positioned within the housing or casing so formed are a pair of slide members G $G^1$ provided on their inner or opposed edges with racks $G^2$ $G^3$ spaced apart sufficiently to admit the pinion $G^4$ in mesh with both racks. The walls of the casing members F $F^3$ form guides for the racks and centrally they are shaped or vertically spaced apart or spaced away, as at $G^5$, $G^6$ to provide room for the endwise movement of the racks therebetween.

The links $E^4$ are secured at their inner ends to one or the other of the two slides G $G^1$ in any suitable manner. I illustrate however, in Figure 8, a bearing pin H upon which rotates a sleeve $H^1$ the longitudinal movement of which is limited by the nut $H^2$. The sleeve $H^1$ is provided with a pair of ears $H^3$ between which is pivoted an eye $H^4$, at the inner end of the link $E^4$, the eye being penetrated by a pivot pin $H^5$ secured in said ears. Obviously I might substitute a ball and socket joint substantially identical with that at the opposite end of the link but I prefer the above described joint.

The pinion $G^4$ is keyed to the outer end of the shaft I the inner end of which is controlled for example by the crank $I^1$ and the handle $I^2$. Intermediate such handle and the frame member A is a housing member $I^3$ which serves to enclose the ratchet wheel $I^4$ held against rotation in relation to the shaft I. Such wheel may be engaged by the pawl $I^5$ pivoted as at $I^6$ and controlled for example by the tension spring $I^7$. $I^8$ is a pin upon said pawl $I^5$ projecting outwardly through the arcuate slot $I^9$ whereby the position of the pawl may be manually governed, the tension spring $I^7$ serving to hold the pawl in contact with the ratchet wheel $I^4$, when in the position shown in full line in Figure 2 and to hold it out of engagement therewith, when in the position shown in dotted line in the same figure. A further control means for limiting movement of the ratchet wheel $I^4$ is the spring K cut away at its free end as at $K^1$ to permit the passage therethrough of the shaft I, the arms $K^2$ thus formed being in frictional engagement with the face of the ratchet wheel $I^4$. The tension of the spring may be controlled by the set screw $K^5$. $K^6$ is a washer of leather or other suitable material against which the pressure of the spring K tends to thrust said ratchet.

Referring to the form shown in Figures 10 and 11 the links $E^4$ instead of being directly connected to the visor, terminate in balls L seated in a socket member $L^1$, such socket member having pivoted to it the levers $L^2$ $L^3$.

The opposite end of the lever $L^2$ is pivoted to a hinge member $L^4$ which in turn is pivoted to the ear $L^5$ on the visor frame B. The opposite end of the lever $L^3$ is pivoted to a similar hinge member $L^6$, in turn pivoted to the ear $L^7$ secured for example by the screws $L^8$ to the frame member A. $L^9$ $L^{10}$ are an additional pair of levers, $L^9$ being secured to the hinge $L^4$ and $L^{10}$ to the hinge $L^6$, the two being hinged together as at $L^{11}$ and being connected at that point, for example by the tension spring $L^{12}$ to the ball member $L^1$.

The form of Figures 12 and 13 is adapted for use with a body wherein the wind shield M is fitted between guides or slides $M^1$ and is lifted slidably to the top of the body. In order to prevent interference with the upward movement of the wind shield I employ a pinion shaft $M^2$ located closely beneath the roof of the vehicle and carrying the pinion $M^3$ which meshes with the top of the rack $M^4$. The bottom of said rack is also toothed and meshes with a free running pinion $M^5$ which in turn meshes with the top of the opposite rack $M^6$. The shaft $M^2$ may be rotated by any suitable means, for example by the shaft $M^7$ to which it is connected by the universal joint $M^8$, $M^9$ being a handle for such shaft and $M^{10}$ any suitable bracket or support.

Referring to the form of Figures 14 and 15 which relate to a motor driven type I illustrate a motor casing O having within it a small motor $O^1$ in connection for example by the conductive line $O^2$ with any suitable electric power source. $O^3$ indicates a control switch. The motor shaft $O^4$ is provided with a worm $O^5$ in mesh with a worm mesh $O^6$ at the outer end of the shaft I.

Referring to Figure 16 I may employ with any of the hand rotated or operative forms a crank lever P pivoted as at $P^1$ to the outer end of the shaft I provided with a handle $P^2$. $P^3$ is a disc provided with ratchet teeth $P^4$ in mesh with a pawl $P^5$ on the crank P. $P^6$ indicates any suitable tension means, for example a coil spring, adapted to draw the crank P and the pawl $P^5$ inwardly toward the disc $P^3$ and $P^7$ is an abutment upon the shaft I to limit the outward movement of the crank and handle when manually withdrawn for rotation.

Figure 18 illustrates a variant form of power transmission in which the racks $G^2$ $G^3$ are actuated by the pinion $G^4$ on the shaft I. Mounted on the inner end of the shaft I is the gear S in mesh with the pinion $S^1$. The pinion $S^1$ may be rotated through the shaft $S^2$ and the crank $S^3$.

It will be realized that whereas I have described and shown an operative device, nevertheless it will be obvious that many changes might be made in the size, shape, number and disposition of parts without departing from the spirit of my invention and I therefore wish my description and drawings to be taken as in a sense diagrammatic rather than as limiting me to my specific showing.

The use and operation of my invention are as follows:

I provide an adjustable visor which is positively secured, preferably at each end of the visor. I effect the adjustment by laterally moving the inner ends of the supporting links E⁴. In order to permit their lateral movement to effect the rotation or adjustment of the visor, I may provide the links with a universal or ball and socket connection at each end. In the form shown in Figures 1 and following I employ a pair of racks, both in mesh with a single interposed pinion. The pinion is positively controlled by a crank and handle and unintended movement of such handle, and therefore of the pinion, is controlled by the ratchet wheel I⁴ and the pawl I⁵. The spring K further brakes or slows the rotation of the pinion shaft.

Either end of the link may carry any form of joint which will provide necessary motion utilized in operating the hinge at top of visor when the links are operated by the rack and pinion. Since the motion of the racks is limited to a lateral direction and the visor end of the link has only a vertical motion, it will be seen that the link itself will have a compound motion, as the link must move laterally at the rack end and vertically at the visor end, the motion being a combination of lateral and vertical motion.

The form shown in Figures 12 and following in particularly adapted to wind shields wherein the glass is raised instead of being forwardly tilted. The pinion shaft M² is positioned just beneath the top of the car and in order to permit it to be there positioned I employ the double rack member M⁴ and interpose a second pinion M⁵ between the lower ends of the rack and the rack M⁶.

As shown in Figures 14 and 15 I may, if desired, employ a small motor for effecting adjustment of the visor.

For operating a heavy visor, for example, of glass, it may be necessary to multiply the power of the operating handle by means of a reducing gear, as shown in Figure 18. The small gear or pinion will also act as an effective means for preventing rotation of the large gear, as it will be practically impossible for the weight of the visor or the pressure of the wind to spin the pinion.

Whereas I have illustrated means for obtaining longitudinal movement of the inner end of the link in the form of a pair of racks, obviously I do not wish to be limited to this particular expedient and may employ any other suitable means for imparting to the inner ends of the links the longitudinal movement in order to effect the vertical movement of their outer ends.

I claim:

1. An adjustable visor for automobile bodies, including a visor member hinged to a portion of the automobile body, a plurality of supporting links attached to said visor, transversely movable slides mounted upon such body, to which such links are pivoted, said slides including opposed rack members, a pinion interposed between said racks and in mesh with each, a shaft controlling said pinion and means for rotating it, and means adapted normally to prevent rotation of said shaft, comprising a ratchet wheel upon said shaft and a pawl adapted to engage it, means for withdrawing such pawl, and yielding means adapted to hold said pawl in contact with said ratchet wheel.

2. An adjustable visor for automobile bodies, including a visor member hinged to a portion of the automobile body, a plurality of supporting links attached to said visor, transversely movable slides mounted upon such body, to which such links are pivoted, said slides including opposed rack members, a pinion interposed between said racks and in mesh with each, a shaft controlling said pinion and means for rotating it, and means adapted normally to prevent rotation of said shaft, comprising a ratchet wheel upon said shaft and a pawl adapted to engage it, means for withdrawing such pawl, and yielding means adapted to hold said pawl in contact with said ratchet wheel, and, when said pawl is moved to withdrawn position, to hold it in such withdrawn position.

3. An adjustable visor for vehicle bodies, including a visor member hinged to a portion of the body, a plurality of supporting links attached to said visor, transversely movable slides mounted upon said body, to which said links are pivoted, said slides including opposed racks, a pinion interposed between said racks and in mesh with each, a shaft controlling said pinion and means for rotating it, and means adapted normally to prevent rotation of said shaft, including a ratchet wheel and a frictional member adapted to engage the face of said ratchet wheel in order further to limit its rotation.

4. An adjustable visor for vehicle bodies, including a visor member hinged to a portion of the body, a plurality of supporting links attached to said visor, transversely movable slides mounted upon said body, to which said links are pivoted, said slides including opposed racks, a pinion interposed between said racks and in mesh with each, a shaft controlling said pinion and means for rotating it, and means adapted normally to prevent rotation of said shaft, including a ratchet wheel and a spring member adapted to engage the face of said ratchet wheel and adapted to impede its rotation.

5. An adjustable visor for vehicle bodies, including a visor member hinged to a portion of the body, a plurality of supporting links attached to said visor, transversely movable slides mounted upon said body, to which said links are pivoted, said slides including opposed racks, a pinion interposed between said racks and in mesh with each, a shaft controlling said pinion and means for rotating it, means adapted normally to prevent rotation of said shaft, a device secured to said shaft, a resilient member adapted to engage said device to impede its rotation, and means for adjusting the tension of said member.

6. An adjustable visor for vehicle bodies including a visor member hinged to a portion of the body, a plurality of supporting links attached to said visor, transversely movable slides mounted upon said body to which said links are pivoted, said slides including opposed racks, a pinion interposed between said racks and in mesh with each, a shaft controlling said pinion, means for rotating it, and means for preventing rotation of the shaft comprising a ratchet wheel and a pawl arranged to engage and disengage said wheel.

7. An adjustable visor for vehicle bodies including a visor member hinged to a portion of the body, a plurality of supporting links attached to said visor, transversely movable slides mounted upon said body to which said links are pivoted, said slides including opposed racks, a pinion interposed between said racks and in mesh with each, a shaft for controlling said pinion, means for rotating it, means for preventing rotation of the shaft comprising a ratchet wheel thereon and a pawl arranged to engage and disengage said wheel and means for operating said pawl into and out of engagement with the wheel.

8. In an adjusting mechanism, the combination with a visor hinged along its upper horizontal edge to the upper transverse portion of a vehicle body, and swingable outwardly relative thereto, of a pair of links each operatively connected at its outer end to the inner side of said visor to swing relative thereto, a pair of devices slidably mounted on the upper transverse portion of the body above the line of vision and below the hinge for said visor to move in a plane substantially parallel to the axis on which said visor swings and each pivotally connected at its outer portion to the inner end of the adjacent link, whereby movement of said devices simultaneously outwardly or simultaneously inwardly will effect adjustment of said visor, and means mounted on the upper transverse portion of the vehicle body for simultaneously moving said devices.

Signed at La Porte, county of La Porte and State of Indiana, this 10th day of May 1926.

ARTHUR R. SIMON.